United States Patent [19]

Ohteru

[11] Patent Number: 5,050,234
[45] Date of Patent: Sep. 17, 1991

[54] METHOD FOR CONNECTING A CHANNEL BETWEEN A BASE STATION AND A MOBILE STATION

[75] Inventor: Youichi Ohteru, Tokyo, Japan

[73] Assignee: NEC Corp., Japan

[21] Appl. No.: 501,614

[22] Filed: Mar. 29, 1990

[30] Foreign Application Priority Data

Mar. 30, 1989 [JP] Japan ................... 1-79869

[51] Int. Cl.$^5$ .......................... H04Q 7/00; H04B 1/00
[52] U.S. Cl. ........................................ 455/34; 455/54; 455/62; 455/67
[58] Field of Search .................. 455/54, 62, 56, 63, 455/33, 34, 67, 295; 379/58, 59, 63

[56] References Cited

U.S. PATENT DOCUMENTS

| | | | |
|---|---|---|---|
| 4,485,486 | 11/1984 | Webb et al. | 455/33 |
| 4,638,479 | 1/1987 | Alexis | 370/95 |
| 4,736,453 | 4/1988 | Schloemer | 455/33 |
| 4,783,780 | 11/1988 | Alexis | 370/95 |
| 4,792,984 | 12/1988 | Matsuo | 455/32 |
| 4,794,635 | 12/1988 | Hess | 379/60 |

FOREIGN PATENT DOCUMENTS 0308253  3/1989  European Pat. Off. .............. 455/34

Primary Examiner—Reinhard J. Eisenzopf
Assistant Examiner—Chi H. Pham
Attorney, Agent, or Firm—Ostrolenk, Faber, Gerb & Soffen

[57] ABSTRACT

A radio communication system comprises a plurality of subsystems each including a base station and a mobile station. A connection is to be allowed between the base and mobile stations in a subsystem by a first decision, when they have a first distance shorter than a predetermined distance therebetween. Then, the connection is finally allowed by a second decision, when the subsystem has a second distance longer than another predetermined distance therebetween from another subsystem. The first and second distances are detected in the base station by receipt levels of signals. The first distance may be changed dependent on the existence of an interference from outside subsystems.

5 Claims, 4 Drawing Sheets

METHOD FOR CONNECTING A CHANNEL BETWEEN A BASE STATION AND A MOBILE STATION

FIELD OF THE INVENTION

This invention relates to a method for connecting a channel between a base station and a mobile station, and more particularly to, a method for designating a channel from a plurality of channels between a base station and a mobile station in a cordless telephone set, and the like.

BACKGROUND OF THE INVENTION

In a cordless telephone set, etc., a plurality of subsystems are included to provide a radio communication system, wherein each of the subsystems includes a base station and a mobile station. In each subsystem, a pair of channels are used for communication in both directions between the base station and the mobile station. In designating a channel among plural communication channels, a request of communication is transmitted, for instance, from the base station through an exclusive channel to the mobile station. Then, a signal level is detected in a first selected channel at the base station. In this detection, when a predetermined condition is met for communication from the mobile station to the base station, the first selected channel is designated to be used for the communication. In the same manner, a signal level is detected in a second selected channel at the mobile station. In this detection, when a predetermined condition is met for communication from the base station to the mobile station, the second selected channel is designated to be used for the communication. Thus, the first and second selected channels are used for the communication in the both directions between the base and mobile stations.

For the purpose of designating a channel among a plurality of channels, U.S. application Ser. No. 465,320 entitled "a method for connecting channels of decentralized radio system" which has been assigned to the some assignee of this application has been filed on Jan. 16, 1990 by Yukitsuna Furuya.

In this method of connecting channels of decentralized radio systems which method is generally called "a carrier sensing method", each subsystem sets a given channel to monitor a reception signal level. If the reception signal level of the given channel is higher than a threshold value, a next channel is set. When the given channel is an empty channel in the detecting result that the reception signal channel is lower than the threshold value, the communication is started by use of the channel. Each subsystem increases the threshold value, when the channel connection is rejected, while each subsystem decreases the threshold value, when the communication is started. This method will be explained in more detail later.

However, this proposed method has a disadvantage in that a control, under which communication is rejected, occurs even in a state when communication is possible, that is when a threshold value is fixed to be a relatively small value which is usually higher than a noise level by a small predetermined level. On the other hand, when the threshold is set to a high value, a condition of allowing a request of communication is relieved, so that a case in which the communication is interfered by communication in another subsystem is increased with greater frequency.

In order to overcome these disadvantages, a method for connecting a channel between a base station and a mobile station which is generally called "a selection method", in which communication is allowed to start, when a difference between levels of signals supplied from mobile stations in a channel selecting subsystem and a neighboring subsystem is larger than a predetermined level, is being considered for implementation.

Even in this selection method, however, there is a further disadvantage in that communication which is then started in the neighboring subsystem is interfered with by the previously started communication, where a mobile station is far from a base station in the neighboring subsystem, although this will be explained in more detail later.

SUMMARY OF THE INVENTION

Accordingly, it is an object of this invention to provide a method for connecting a channel between a base station and a mobile station, in which an effective use of channels is realized.

It is a further object of this invention to provide a method for connecting a channel between a base station and a mobile station, in which the incidence of communication interference is decreased.

It is a still further object of this invention to provide a method for connecting a channel between a base station and a mobile station, in which communication interference is decreased, even if a mobile station is far from a base station.

According to the present invention, a method for connecting a channel between a base station and a mobile station, comprises the steps of:

providing a plurality of subsystems each including a combination of said base station and said mobile station to set up a radio communication system;

receiving a first signal supplied from said mobile station at said base station;

detecting a level of said first signal and comparing it to a first threshold level;

selecting one channel from a plurality of channels and detecting a level of a second signal in said one channel, when said first signal level is higher than said first threshold level;

calculating the difference between said first and second signal levels and comparing it with a second threshold level;

connecting said mobile station through said one channel to said base station, when said difference is larger than said second threshold level, whereby communication is carried out between said base and mobile stations; and changing said first threshold level in accordance with a determination whether or not of an interference with a neighboring subsystem of said subsystems occurred during said communication.

BRIEF DESCRIPTION OF THE DRAWINGS

This invention will be explained in more detail in conjunction with appended drawings, wherein.

DESCRIPTION OF THE PREFERRED EMBODIMENTS

Figure 1:
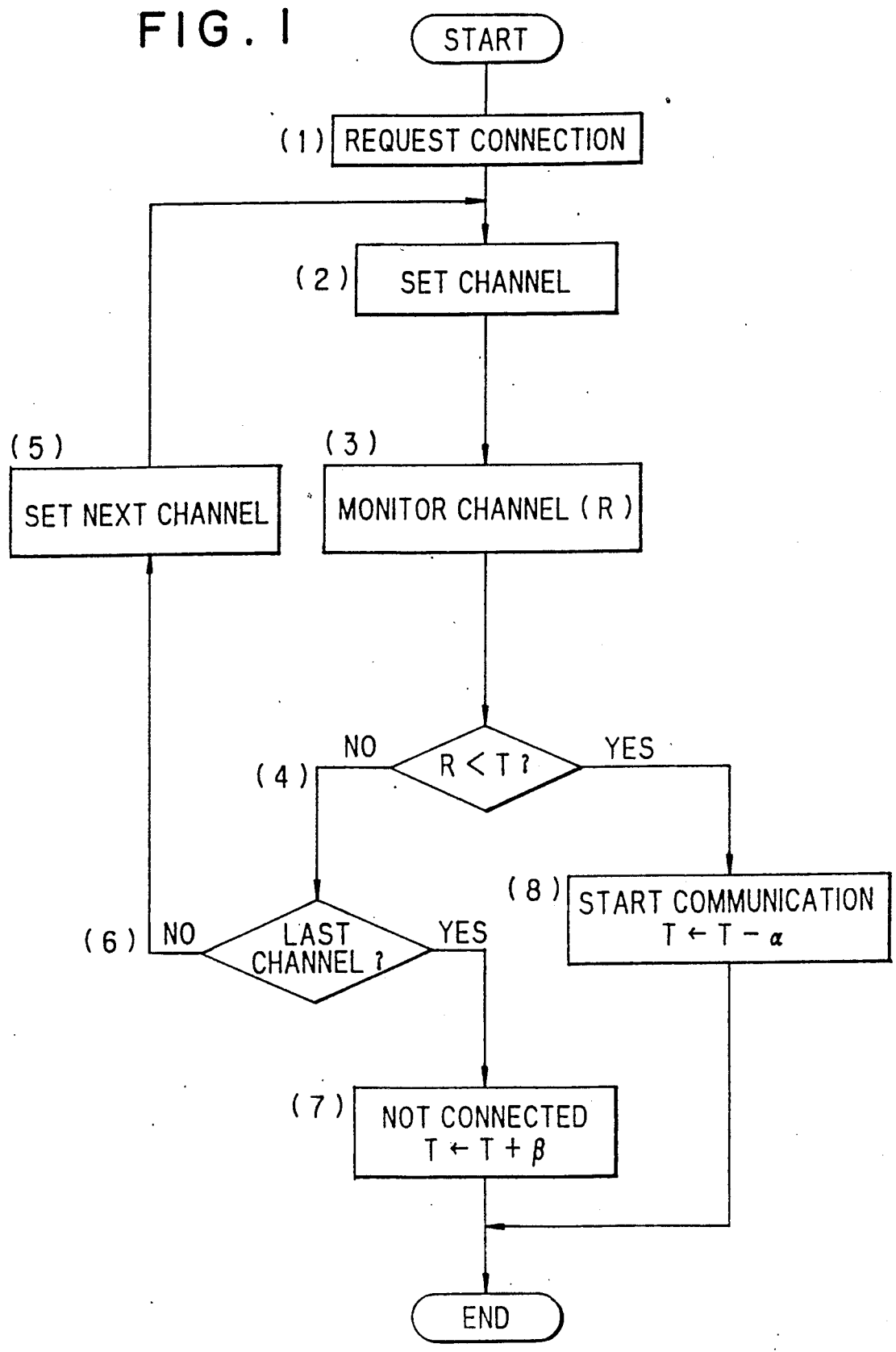
FIG. 1 is a flow chart explaining the operation of a method for connecting channels of decentralized radio systems in accordance with the aforementioned U.S. patent application.

Before explaining the method for connecting a channel i.e., a radio communication link, between a base station and a mobile station in accordance with the preferred embodiment, the proposed method of the aforementioned U.S. application will be explained by reference to FIG. 1, wherein a control flow is applied to a mobile station in a cordless telephone set. When a channel connection request is detected (step 1), the mobile station sets the first channel to be monitored (step 2). If the detected reception signal level is detected to be a R (step 3), the mobile station compares the reception signal level R with a threshold value T (step 4). If the level R is higher than the threshold value T, the mobile station determines that the first channel is busy. The mobile station then sets the next channel (step 5), and repeats the same operation as described above. When the mobile station determines that all channels are busy (step 6), the channel connection is rejected, and a busy tone is generated. At the same time, the mobile station increases the threshold value T by $\beta$ (step 7). If any channel satisfies the condition that R is lower than T, this channel is determined to be available (step 8), and communication is started through this channel. At the same time, the threshold value is decreased by $\alpha$ (step 8). The threshold value T is decreased under this control when communication is successfully performed. However, when all the channels are busy, the threshold value is increased. Therefore, when subsystems which use identical frequencies are not present near this mobile station, the threshold value is gradually decreased and becomes almost the noise level. If the level of the threshold value is lower than the noise level, the mobile station detects that all the channels are busy, and therefore the threshold value is increased by $\beta$ (step 7). For example, when the value $\beta$ is set to be 30 times the value $\alpha$, the channel connection cannot be performed once in 30 times, and recalling is performed. However, when the number of subsystems is increased, and the number of channels is substantially limited, a calling loss occurs even with a higher threshold value.

Figure 2:
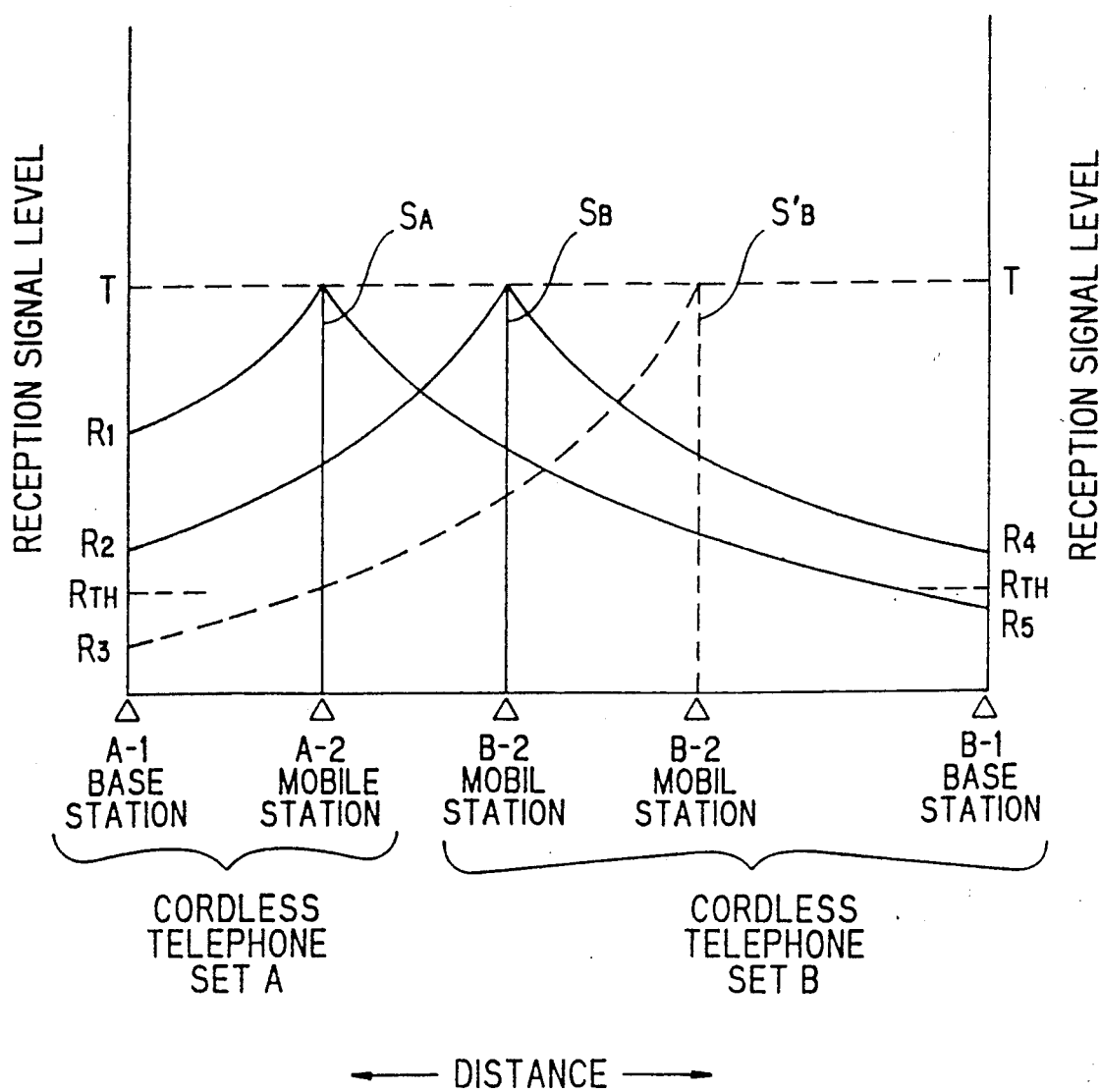
FIG. 2 is an explanatory diagram showing receipt levels of a signal in a channel selecting subsystem and a signal received from a neighboring subsystem.

FIG. 2 shows a relation of received signal levels relative to distances of two cordless telephone sets A and B, respectively, including base stations A-1 and B-1, and mobile stations A-2 and B-2. Here, it is assumed that signals $S_A$ and $S_B$ having a level T are transmitted through the first channel from the mobile stations A-2 and B2, and are received with levels $R_1$ and $R_2$ at the base station A-1. The base station A-1 determines that the first channel is busy, because the received signal $R_2$ is higher than a threshold level $R_{TH}$. In this situation, however, communication can be carried out in the cordless telephone set A, because the received signal level $R_1$ is higher than the received signal level $R_2$ by a predetermined level, due to the fact that a distance is short between the base and mobile stations A-1 and A-2. As apparent from this explanation, a difference of the receipt signal levels $R_1$ and $R_2$ is significantly important in deciding whether to allow communication in addition to the comparison of a received signal level with a threshold value. This results in the disadvantage in the carrier sensing method. For this reason, when the mobile station B-2 is positioned in place to transmit a signal $S_{B'}$ which is received with a level $R_3$ at the base station A-1, communication is allowed to start in the cordless telephone set by using the first channel, because the received signal level $R_3$ is lower than the threshold levels $R_{TH}$ as shown a dotted line.

The selection method, in which the difference between the received signals $R_1$ and $R_2$ are detected to determine the start of communication, has been proposed to overcome the disadvantage of the carrier sensing method. According to the selection method, communication is started in the cordless telephone set A by using the first channel, even if the received signal level $R_2$ is higher than the threshold level $R_{TH}$. When the communication is started in the cordless telephone set A, there is a possible risk in which the cordless telephone set B is interfered by the communication of the cordless telephone set A, because the mobile station B-2 is far from the base station B-1, so that a difference between received signal levels $R_4$ and $R_5$ is small at the base station B-1, as clearly shown in FIG. 2. This is the disadvantage of the selection method.

Figure 3:
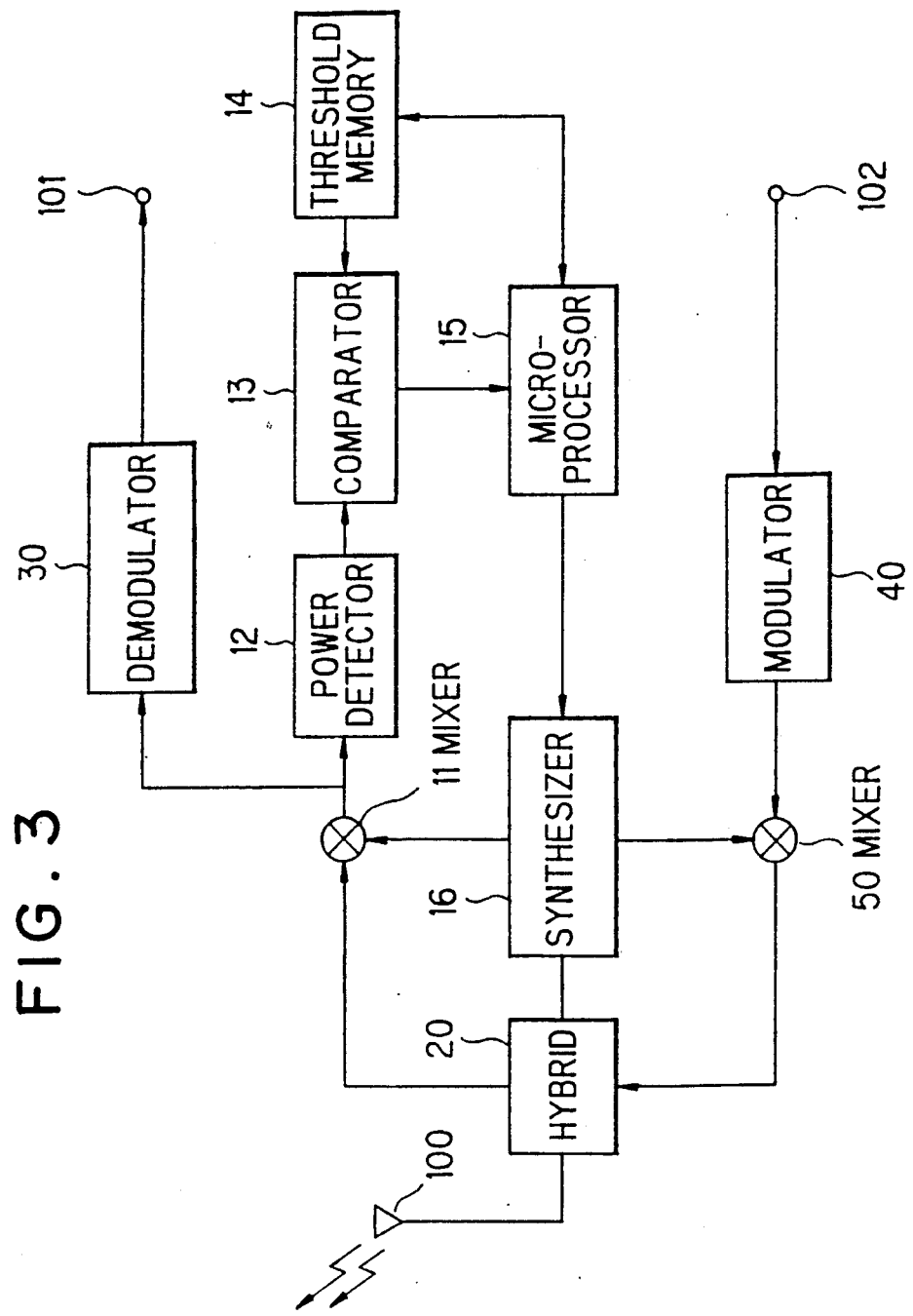
FIG. 3 is a block diagram showing a radio communication apparatus in which a method for connecting a channel between a base station and a mobile station in a preferred embodiment according to the invention is carried out.
Figure 4:
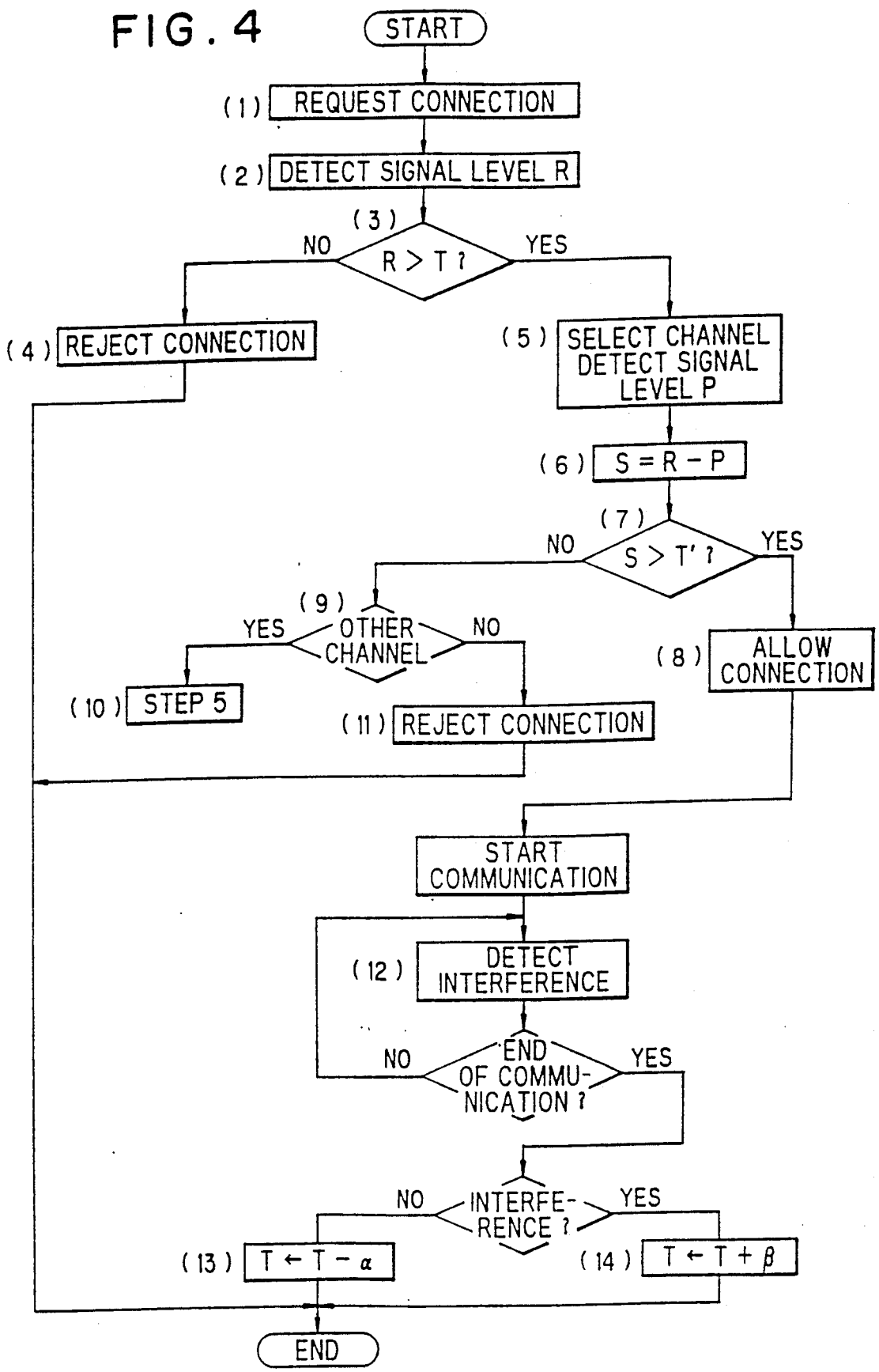
FIG. 4 is a flow chart explaining the operation of the preferred embodiment of FIG. 3.

Next, a method for connecting a channel between a base station and a mobile station in the preferred embodiment will be explained by reference to FIG. 3, wherein an apparatus for embodying the preferred method is shown.

The apparatus comprises an antenna 100 for transmitting and receiving signals, a hybrid circuit 20 for supplying a received signal to a following stage and a signal to be transmitted to the antenna 100, a mixer 11 for multiplying the received signal by a carrier signal supplied from a synthesizer 16 to provide an intermediate signal, a power detector 12 for detecting the level of the intermediate signal, a comparator 13 for comparing the signal level with a threshold level stored in a threshold memory 14, a microprocessor 15 for changing the frequency of the carrier supplied from the synthesizer 16 and a threshold level to be stored into the memory 14, a demodulator 30 for demodulating the intermediate signal to provide a demodulated signal at an output terminal 101, a modulator 40 for modulating a transmitting signal supplied from an input terminal 102 to provide a modulated signal, and a mixer 50 for mixing the modulated signal and a carrier supplied from the synthesizer 16 to supply a radio frequency signal to the antenna 100.

In operation, when a request of connection is supplied from a mobile station to a base station (step 1), a signal supplied from the mobile station is received in the base station by the antenna 100. The received signal is mixed with a carrier supplied from the synthesizer 16, so that the level of the intermediate signal thus generated in the mixer 11 is detected to provide a received signal level R by the power detector 12 (step 2). The received signal level R is compared with a threshold level T stored in the memory 14 by the comparator 13 (step 3). In this comparison, when the received signal level R is smaller than the threshold level T, a connection is rejected by the control of the microprocessor 15, as a result of the decision that communication would be impossible to be carried out (step 4). On the other hand, when the received signal level R is larger than the threshold level T, one channel is selected from plural channels, and received signal level P thereof is detected in the selected channel (step 5). Then, a subtraction is carried out between the received signal levels R and P (step 6) to provide a difference signal S (=R−P). The difference signal S is compared with another threshold level T' stored in the memory 14 by the comparator 13, and the comparison result is supplied to the microprocessor 15 (step 7). In this comparison, when the difference signal S is larger than the threshold level T', the mobile station is connected through the selected channel to the base station (step 8), as a result of the decision being made that communication can be carried out through the selected channel from the base station to the mobile station. On the other hand, when the difference signal S is smaller than the threshold level T', the decision is not to use the selected channel for communication between the base and mobile stations. In that case, another channel is selected, the selected channel undergoing the same processing as described above (steps 9 and 10). When all channels are determined not to be ready for communication, the invitation to connect the base and mobile stations is rejected (step 11). As explained in the step 8, when the selected channel can be used for communication, and the base and mobile stations are connected through the selected channel, the degree of interference continues to be monitored in the selected channel during the communication (step 12). When no interference is detected during the communication, a new threshold level T−α is set by subtracting from the threshold level T the α value and storing the result in the threshold memory 14 (step 13). On the other hand, when interference is detected to exceed a predetermined level, the threshold level is set to T+β by adding to the threshold level T the β value and storing the result the threshold memory 14 (step 14).

As explained relative to step 13, when the threshold level T is decreased by the level α, a distance between the base and mobile stations, by which it is decided that communication is possible is lengthened. As a result, the area over which a given cordless telephone set can operate is widened when the total system is not crowded by many other cordless telephone sets, so that the freedom of movement of the mobile station is increased.

On the contrary, as explained in connection with 14, when the threshold level T is increased by the level β, the effect is to avoid interference where the system is crowded, and the operational distance of the mobile station is decreased.

As explained above, the present invention flexibly adjusts itself to total system environment changing the allowable distance between base and mobile station. Thus interference is effectively avoided among the various subsystems of decentralized radio systems.

Although the invention has been described with respect to a specific embodiment for the sake of clarity, the appended claims are not to be thus limited but are to be construed as embodying all modification and alternative constructions that may occur to one skilled in the art which fairly fall within the basic teaching herein set forth.

What is claimed is:

1. A method for establishing a radio communication link between a base station and a mobile station, comprising the steps of:
    (a) providing a plurality of subsystems each including a base station having a plurality of communication channels and a mobile station;
    (b) receiving a first signal from said mobile station at said base station;
    (c) detecting a level of said first signal and comparing said first signal level to a first threshold level;
    (d) selecting a first selected channel from said plurality of channels and noting a second signal level associated with said first selected channel, when said first signal level is higher than said first threshold level;
    (e) calculating a difference between said first and second signal levels and comparing said difference to a second threshold level;
    (f) establishing a radio communication link between said mobile station and said first selected channel when said difference is larger than said second threshold level, whereby communication is then carried out between said base and mobile stations;
    (g) monitoring said radio communication link for the presence of radio interference emanating from a neighboring subsystem; and
    (h) changing said first threshold level on the basis of whether or not interference from a neighboring subsystem has occurred during said radio communication link.

2. The method of claim 1, further comprising:
refraining from establishing a connection between said base station and said mobile station, when said first signal level is lower than said first threshold level.

3. The method of claim 1, further comprising:
selecting another channel other than said first selected channel from said plurality of channels, when said difference is smaller than said second threshold level, and carrying out said steps (d), (e), (f), (g) and (h) for said another channel.

4. The method of claim 1, further comprising:
refraining from establishing a connection between said base station and said mobile station, when said difference is smaller than said second threshold level in all of said plurality of channels.

5. The method of claim 1, wherein:
said first threshold level is increased by a first predetermined level, when said interference is detected; and
said first threshold level is decreased by a second predetermined level, when said interference is not detected.

* * * * *